Patented June 30, 1936

2,045,592

UNITED STATES PATENT OFFICE 2,045,592

RESINOUS PRODUCTS

Louis H. Fitch, Jr., Bartlesville, Okla., assignor to Phillips Petroleum Company, Bartlesville, Okla., a corporation of Delaware No Drawing. Application August 11, 1932, Serial No. 628,449

15 Claims. (Cl. 260—2)

The present invention relates to the catalytic preparation of resinous reaction products of sulfur dioxide and olefines, and also to a method of preparing olefine-containing gas mixtures, such as the products of the pyrolysis of hydrocarbon gas, petroleum, coal, etc., for reaction with sulfur dioxide.

Certain olefines may be reacted with sulfur dioxide to form highly polymerized, resin-like products, as described in British Pat. 11,635 (1914). Among the olefines suitable for the production of these materials are ethylene, propylene, 1-and 2-butenes, 1-pentene, isopropyl ethylene, 1 hexene, and virtually all other mono-substituted ethylenes containing less than twelve carbon atoms.

These olefines may be produced in a pure state only by expensive synthetic methods, but complex mixtures containing these olefines may be produced very cheaply by the pyrolysis of hydrocarbons, as in oil cracking, coke production and the like. Such mixtures may be separated by fractional distillation into groups of hydrocarbons of similar boiling point, as, for example a fraction containing predominantly butanes and butenes, or one containing predominantly pentanes and pentenes, or groups of greater boiling point range.

Such fractions, where the hydrocarbons contain more than three carbon atoms, always contain appreciable quantities of unsymmetrically disubstituted ethylenes; that is, olefines having two carbon atoms attached to the carbon at one end of the ethylene bond. For example, the butane-butene fraction of the vapors normally produced in oil refineries will usually contain an appreciable amount, say 10 or 20% of isobutylene (2 methyl propene). It has been found that when such a material is reacted with sulfur dioxide to form a highly polymerized resin-like product, the presence of this isobutylene will affect both the rate of reaction of the other butenes, i. e. 1-butene, cis-2-butene and trans-2-butene, with sulfur dioxide, and the nature of the products produced thereby, although the isobutylene itself does not enter in appreciable measure into the reaction.

Whether the reaction be catalyzed by light or the addition of catalytic substances, it proceeds much more slowly when appreciable quantities of isobutylene are present in the mixture. This decrease in velocity may amount to virtual arresting of the reaction in some cases. For example, when 1 part of 2-butene is mixed with 2 parts of liquid sulfur dioxide, and exposed to sunlight at 20° C., or when such a mixture, containing in addition 0.5% by weight of benzoyl peroxide is kept at this temperature in the dark, the 2-butene is converted almost completely to a solid, resinous product in 24 hours. When such a mixture contains in addition 2 parts of isobutylene, virtually no resinous product is formed in the course of two weeks under the influence of either or both of these catalysts combined. Similarly, mixtures of isobutylene and propylene with sulfur dioxide form little or no resinous product when exposed to the sun, though under these conditions, propylene alone readily forms a resinous compound with the sulfur dioxide.

According to the present invention, the isobutylene content of oil refinery vapors or similar pyrolysis products is reduced before such materials are treated with sulfur dioxide to produce products of a resinous nature.

While isobutylene has been used here as an illustration, we have found that unsymmetrical methyl ethyl ethylene, trimethyl ethylene, or any other unsymmetrically disubstituted ethylene will produce like effects, and their removal from any mixture to be reacted with sulfur dioxide is likewise desirable. Saturated hydrocarbons, on the other hand, and certain other olefines, such as 2-hexene, act primarily as diluents, and may be left in the reaction mixture.

The presence of such unsymmetrically disubstituted ethylenes will also affect appreciably the nature of the product produced from a given mixture. In general, their presence in concentrations not high enough to arrest the reaction, results in the production of resin of lower softening temperature, showing many evidences of being in a lower stage of polymerization. This may be desirable in some cases, as these lower melting resins are more easily molded, and more soluble in certain solvents, enabling them to be incorporated in larger quantities in lacquers or film forming mediums. It has been found that amounts of isobutylene not exceeding 20 per cent of the resin forming olefines present in the reaction mixture will modify the properties of the resin without too greatly inhibiting the reaction.

For example, the product of the reaction of 2-butene with sulfur dioxide in the presence of light and benzoyl peroxide is soluble only with difficulty in nitromethane, yielding a solution of low viscosity and low content of total solids. If, however, the same materials be reacted in like manner in the presence of some isobutylene or trimethyl ethylene, the products so formed are quite readily soluble in nitromethane, and a solution of high viscosity and total solids content may be quite readily produced.

Further modification of the properties of the reaction product of butenes and sulfur dioxide may be obtained by varying the relative concentrations of 1-butene and 2-butenes in the reaction mixture. Whereas, the 2-butenes alone, under certain conditions, as for example, in the presence of both benzoyl peroxide and sunlight, react with sulfur dioxide to produce a resinous product of excellent hardness and resistance to the action of solvents, this product softens only at temperatures above 170° C., or very close to the temperature at which serious decomposition commences, and are consequently difficult to mold under heat and pressure, particularly if a transparent product is desired. If the reaction with sulfur dioxide be carried out under the same conditions with mixtures of 1- and 2-butenes, the products formed are found to be progressively lower melting, or more fusible, as the 1-butene content is increased. Since the stability of these products to heat is not lowered to any such degree as is their temperature of softening or fusion, they can be maintained at 150–175° C. in a soft or semi-fluid condition under pressure, as for example, in a mold, for appreciable periods of time before appreciable decomposition takes place.

A product possessing good molding properties can be produced by reacting mixtures containing from 15% to 50% of 1-butene, and the balance 2-butenes, with sulfur dioxide, either in the presence or absence of diluents or modifying agents, in light, or in the presence of such catalytic substances as are necessary to make the reaction take place. Within this range of composition, the products containing the minimum quantities of 1-butene will have maximum heat resistance and hardness, while those containing the larger proportions of 1-butene will be more fluid under the same degree of heat and pressure, and more suitable for the manufacture of a transparent or translucent molded object. For example, the product made by reacting a mixture of equal portions of 1-butene and 2-butene with sulfur dioxide in sunlight is quite fluid under pressure at 160° C. and may be kept at this temperature for appreciable periods of time without becoming dark, opaque or discolored through decomposition. The product produced from a mixture of 15% 1-butene and 85% 2-butenes is appreciably less fluid at this temperature, but when pressed at somewhat higher temperature (say 175° C.) yields a product of greater heat resistance and mechanical strength and hardness, although decomposition is more rapid at the higher temperature. The products produced by the action of sulfur dioxide on pure 2-butenes are often unsuited to use as molding powders, as they may fuse to a coherent mass only at temperatures so high that serious decomposition takes place.

Where it is desired simply to remove isobutylene (2 methyl propene) from mixtures, such as those found in petroleum refinery vapors, other means may be used. Selective absorption of the isobutylene in cold dilute sulfuric acid, or its polymerization with hot dilute sulfuric acid, or with activated floridin, are means well known to those skilled in the art. It has been discovered, however, that besides those agents mentioned, other materials may be used for the selective polymerization of isobutylene at elevated temperatures. Such materials are toluene sulfonic acid, strong solutions of phosphoric acid, and strong solutions of zinc bromide in methyl, ethyl, or any of the propyl, butyl or amyl alcohols.

For example, a mixture containing all the isomeric butenes and butanes may be agitated for 30 minutes to 2 hours with an equal weight of p-toluene-sulfonic acid at 100° C., thereby converting virtually all of the isobutylene to polymers of higher boiling point without seriously attacking the other butenes present. Under like conditions of time, temperature and concentration, 85% phosphoric acid will be about equally effective, but with solutions of zinc bromide in alcohol, either longer contact time or greater relative quantities of the polymerizing agent will be found desirable. In general, these polymerizing agents may be employed at temperatures ranging from 40 to 120° C., the polymerization taking place somewhat more rapidly at the higher temperatures.

When using these polymerizing agents, the desired product may be obtained by direct distillation from the mixture of product, polymer and reagent, or by decanting the oil layer, containing predominantly polymer and product, and separating the same, preferably after washing with water, by distillation with countercurrent reflux or other means. The polymerizing reagent, when free from appreciable volumes of polymer, is ready for use again immediately, and save for occasional reconcentration, or make up of mechanical losses, may be used indefinitely.

It is well known that olefines like isobutylene, which yield tertiary alcohols upon hydration, are all more reactive, more readily polymerizable than the other olefines of similar boiling point. Consequently these same reagents may, of course, be used to remove undesirable olefines, such as unsymmetrical methyl ethyl ethylene, and trimethyl ethylene, from mixtures of pentanes and amylenes, or the corresponding olefines from mixtures of hexanes and hexenes, heptanes, and heptenes, etc. In place of toluenesulfonic acid, benzene sulfonic acid, or other aromatic sulfonic acid, such as xylene sulfonic acid may be substituted.

Having described the invention, what is claimed is:

1. The process of manufacturing resinous products from sulfur dioxide and mixtures of olefines which consists in eliminating from such mixtures most of the olefines which are disubstituted at one end of the ethylene bond, and thereafter reacting the remaining olefines with sulfur dioxide in the presence of materials which act substantially as diluents.

2. The process of manufacturing resinous products which consists in reacting olefines with sulfur dioxide in the presence of relatively small quantities of other olefines which may be hydrated to tertiary alcohols.

3. In the process of reacting sulfur dioxide with volatile olefin bearing hydrocarbon mixtures, the step of preliminarily reducing the isobutylene content of said mixtures.

4. The method of producing resinous products comprising pyrolyzing carbonaceous material, fractionating the resultant complex mixture, subjecting selected fractions to the action of polymerizing agents adapted selectively to polymerize most of the gamma olefines in said mixture, and catalytically combining unpolymerized olefines with sulfur dioxide.

5. The product obtained by reacting sulfur dioxide with mixtures of 1-butene and 2-butenes, the content of 1-butene ranging from 15 to 50% of the total butene content.

6. The process of manufacture of a material suitable for making molded articles, which consists in reacting sulfur dioxide, with mixtures of butenes in which the concentration of 1-butene ranges from 15% to 50% of the total butene content, and pulverizing the product to a finely divided state suitable for molding.

7. The process of manufacturing resinous products from sulfur dioxide and hydrocarbons which consists in treating a fraction derived from the products of the pyrolysis of hydrocarbon materials with an agent of the group consisting of sulfuric acid, zinc halides, activated floridin, phosphoric acid, and aromatic sulfonic acids, whereby the gamma olefines in the said fraction are selectively polymerized, separating the unchanged hydrocarbons from the polymers so produced, and reacting the said unchanged hydrocarbons with sulfur dioxide.

8. The product obtained by reacting olefines with sulfur dioxide in the presence of small quantities of olefines which may be hydrated to tertiary alcohols.

9. The process of manufacturing resinous products of relatively low softening point and high solubility in certain solvents from butenes, comprising reacting the latter with sulfur dioxide in the presence of small quantities of ethylenes which are unsymmetrically disubstituted by aliphatic hydrocarbon radicals.

10. The process set forth in claim 9, the quantity of said unsymmetrically disubstituted ethylenes not exceeding about 20% of the total olefines present.

11. In the process of reacting sulfur dioxide with olefinic hydrocarbon mixtures including olefines unsymmetrically disubstituted by aliphatic hydrocarbon radicals, the step of preliminarily reducing the content of such disubstituted olefines by the selective polymerization thereof.

12. The process of manufacturing resinous products from sulfur dioxide and mixtures of olefin hydrocarbons containing gamma olefines, which consists in eliminating from such mixtures most of the gamma olefines, and thereafter reacting the remaining olefines with sulfur dioxide.

13. The process of manufacturing resinous products from sulfur dioxide and mixtures of olefin hydrocarbons containing gamma olefines, which comprises separating from the said mixtures a fraction of relatively narrow boiling range consisting principally of hydrocarbons of the group consisting of butanes, butenes, pentanes and pentenes, eliminating from the said fraction most of the gamma olefines contained therein, and thereafter reacting olefines remaining in the fraction with sulfur dioxide.

14. The process of manufacturing resinous products from sulfur dioxide and mixtures of olefin hydrocarbons containing gamma olefines, which comprises separating from the said mixture a fraction consisting principally of butanes and butenes, eliminating from the said fraction most of the iso-butylene, and reacting olefines remaining in the said fraction with sulfur dioxide.

15. The process of manufacturing resinous products from sulfur dioxide and mixtures of olefin hydrocarbons containing gamma olefines, which comprise separating from the said mixture a fraction consisting principally of petanes and pentenes, eliminating from said fraction most of the gamma pentenes, and reacting olefines remaining in the said fraction with sulfur dioxide.

LOUIS H. FITCH, Jr.